US012670374B2

(12) United States Patent
Terasaki

(10) Patent No.: US 12,670,374 B2
(45) Date of Patent: Jun. 30, 2026

(54) RESERVOIR ELEMENT AND ARITHMETIC CIRCUIT

(71) Applicant: TDK CORPORATION, Tokyo (JP)

(72) Inventor: Yukio Terasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1037 days.

(21) Appl. No.: 17/789,998

(22) PCT Filed: Feb. 27, 2020

(86) PCT No.: PCT/JP2020/007926
§ 371 (c)(1),
(2) Date: Jun. 29, 2022

(87) PCT Pub. No.: WO2021/171455
PCT Pub. Date: Sep. 2, 2021

(65) Prior Publication Data
US 2023/0033927 A1 Feb. 2, 2023

(51) Int. Cl.
*G06N 3/063* (2023.01)

(52) U.S. Cl.
CPC ................................... *G06N 3/063* (2013.01)

(58) Field of Classification Search
None
See application file for complete search history.

(56) References Cited

U.S. PATENT DOCUMENTS 5,255,362 A * 10/1993 Brandstetter ........ G06N 3/0675
382/158
5,302,838 A * 4/1994 Roenker .................. H10D 8/50
257/14

2014/0214738 A1 7/2014 Pickett
2017/0364801 A1 * 12/2017 Kim ........................ G06N 3/049
2021/0303981 A1 9/2021 Sasaki et al.
2022/0100470 A1 * 3/2022 Yoshida ................. G06N 3/065

FOREIGN PATENT DOCUMENTS

JP 6620915 B1 12/2019
WO WO-2005072461 A2 * 8/2005 ............. G06N 3/065
WO WO-2016175770 A1 * 11/2016 ............. G06N 3/065

OTHER PUBLICATIONS

Jun. 16, 2020 International Search Report issued in International Patent Application No. PCT/JP2020/007926.
Ryosho Nakane et al.; "Reservoir Computing With Spin Waves Excited in a Garnet Film"; IEEE Access; 2018; vol. 6; pp. 4462-4469.
Kangjun BAI et al.; "DFR: an Energy-efficient Analog Delay Feedback Reservoir Computing System for Brain-inspired Computing"; ACM Journal on Emerging Technologies in Computing Systems; Dec. 2018; vol. 14; No. 4; Article 45; pp. 1-22.

* cited by examiner

*Primary Examiner* — Gregory S Cunningham, II
(74) *Attorney, Agent, or Firm* — Oliff PLC

(57) ABSTRACT

A reservoir element includes a plurality of units. Each of units constituting the plurality of units is connected to at least one or more different units. Each of the plurality of units includes an input terminal to which a first signal is input, a resistor which is connected to the input terminal, a capacitor which is connected to an opposite side of the resistor to the input terminal and is provided between the resistor and a reference potential, a switching element which is connected to the capacitor, and an output terminal which is connected to the switching element. At least one of the plurality of units differs from other units in an RC time constant.

14 Claims, 8 Drawing Sheets

RESERVOIR ELEMENT AND ARITHMETIC CIRCUIT

TECHNICAL FIELD

The present invention relates to a reservoir element and an arithmetic circuit.

BACKGROUND ART

A neuromorphic device is an element imitating the human brain using a neural network. A neuromorphic device artificially imitates a relationship between neurons and synapses in the human brain.

For example, a neuromorphic device has nodes (neurons in the brain) disposed in each layers and transfer means (synapses in the brain) connecting the nodes to each other. In a neuromorphic device, a correct answer rate of questions is increased through learning of the transfer means (synapses). Learning is a process of accumulating knowledge, which may be able to be used in the future, from information, and input data is subjected to be weighted in a neuromorphic device.

Regarding one type of neural network, a recurrent neural network is known. A recurrent neural network includes recursive coupling inside thereof so that time series data can be handled. Time series data is data of which the value changes with elapse of time, and a stock price or the like is an example thereof. A recurrent neural network can also have a non-linear activation unit inside thereof. In such a case, processing in the activation unit can be mathematically regarded as projection to a non-linear multidimensional space. Accordingly, characteristics of complicated signal change in a time-series signal can be extracted. A recursive structure can be realized by returning processing results in neurons of layers in a latter stage to neurons of layers in a former stage, and thus time series data can be processed.

Reservoir computing is a kind of recurrent neural network including recursive coupling and a non-linear activation function. Reservoir computing is a neural network which has been developed as a means for implementing a liquid state machine.

Reservoir computing has a reservoir main body portion and an identification layer coupled to an output layer of the reservoir main body portion as the main components. The reservoir main body portion has a graph structure including recursive coupling between a number of non-linear nodes and nodes. In many cases, an identification layer is constituted of a perceptron with a single layer. Accordingly, neuron coupling of the human brain is regarded as a reservoir (storage reservoir), and a state thereof can be expressed as transition of an interference state of the reservoir.

Regarding characteristics of reservoir computing, a reservoir main body portion is not a learning object, and learning is performed by only an identification layer. Reservoir computing is attracting attention as a system handling time-series signals in the IoT or an edge, in which hardware resources are limited due to a small amount of computer resources necessary for learning.

Moreover, from basic research related to theoretical and mathematical models, recently, regarding a physical device, for example, an application such as realization of a reservoir main body portion using a physical device performing recursive processing through interaction of signals has also been studied. For example, reservoir computing imitates operations of the cerebellum and can perform recursive data processing, non-linear conversion of data (for example, conversion of coordinates), and the like. Patent Literature 1 discloses a reservoir element using spin conduction as an example of a physical device. Non-Patent Literature 1 describes a reservoir element utilizing spin waves as an example of research on a physical device.

CITATION LIST

[Patent Literature]
[Patent Literature 1]
Japanese Patent No. 6620915
[Non-Patent Literature]
[Non-Patent Literature 1]
Ryosho Nakane, Gouhei Tanaka, and Akira Hirose, IEEE Access, Vol. 6, 2018, pp. 4462-4469.

SUMMARY OF INVENTION

Technical Problem

The reservoir element described in Patent Literature 1 utilizes a physical principle on the premise of a magnetic film, but there is still a problem in stably manufacturing by a general CMOS process.

The reservoir element described in Non-Patent Literature 1 utilizes spin waves. However, a reservoir element utilizing spin waves has many problems in terms of industrialization.

The present invention has been made in consideration of the foregoing circumstances and provides a reservoir element and an arithmetic circuit which can be easily commercialized.

Solution to Problem (1) A reservoir element according to a first aspect includes a plurality of units. Each of units constituting the plurality of units is connected to at least one or more different units. Each of the plurality of units includes an input terminal to which a first signal is input, a resistor which is connected to the input terminal, a capacitor which is connected to an opposite side of the resistor to the input terminal and is provided between the resistor and a reference potential, a switching element which is connected to the capacitor, and an output terminal which is connected to the switching element. At least one unit of the plurality of units differs from other units in an RC time constant.

(2) In the reservoir element according to the foregoing aspect, at least one of the plurality of units may have a different resistance value of the resistor.

(3) In the reservoir element according to the foregoing aspect, at least one of the plurality of units may have a different capacitance of the capacitor.

(4) In the reservoir element according to the foregoing aspect, the resistor may be a two-terminal-type variable resistor having a variable resistance value.

(5) In the reservoir element according to the foregoing aspect, three or more resistance states may be able to be selected for the resistor.

(6) In the reservoir element according to the foregoing aspect, an output terminal of a first unit of the plurality of units may be connected to an input terminal of a second unit different from the first unit.

(7) In the reservoir element according to the foregoing aspect, the output terminal of the first unit of the plurality of units and an output terminal of the second unit different from the first unit may be connected to the same wiring.

(8) In the reservoir element according to the foregoing aspect, a second signal may be input to the switching element.

(9) In the reservoir element according to the foregoing aspect, the capacitor may be shared by two or more units.

(10) In the reservoir element according to the foregoing aspect, the resistor may be any of a phase change element, a resistance change-type memory, a magnetic resistance change element, a ferroelectric memory, and a carbon nanotube element.

(11) The reservoir element according to the foregoing aspect may further include an external connection unit which is connected to at least one of the plurality of units and the outside. The external connection unit may include an input terminal to which a first signal is input, a resistor which is connected to the input terminal, a capacitor which is connected to an opposite side of the resistor to the input terminal and is provided between the resistor and a reference potential, a switching element which is connected to the capacitor, and an output terminal which is connected to the switching element.

(12) In the reservoir element according to the foregoing aspect, a resistor in the external connection unit may be a resistance change element.

(13) An arithmetic circuit according to a second aspect is one of a plurality of units in which at least one unit has a different RC time constant. The arithmetic circuit includes an input terminal to which a first signal is input, a resistor which is connected to the input terminal, a capacitor which is connected to an opposite side of the resistor to the input terminal and is provided between the resistor and a reference potential, a switching element which is connected to the capacitor, and an output terminal which is connected to the switching element.

Advantageous Effects of Invention

According to the present invention, it is possible to provide a reservoir element and an arithmetic circuit which can be easily commercialized. More specifically, it is possible to provide a reservoir element which can be easily manufactured utilizing a wiring layer through a CMOS process.

DESCRIPTION OF EMBODIMENTS

Figure 1:
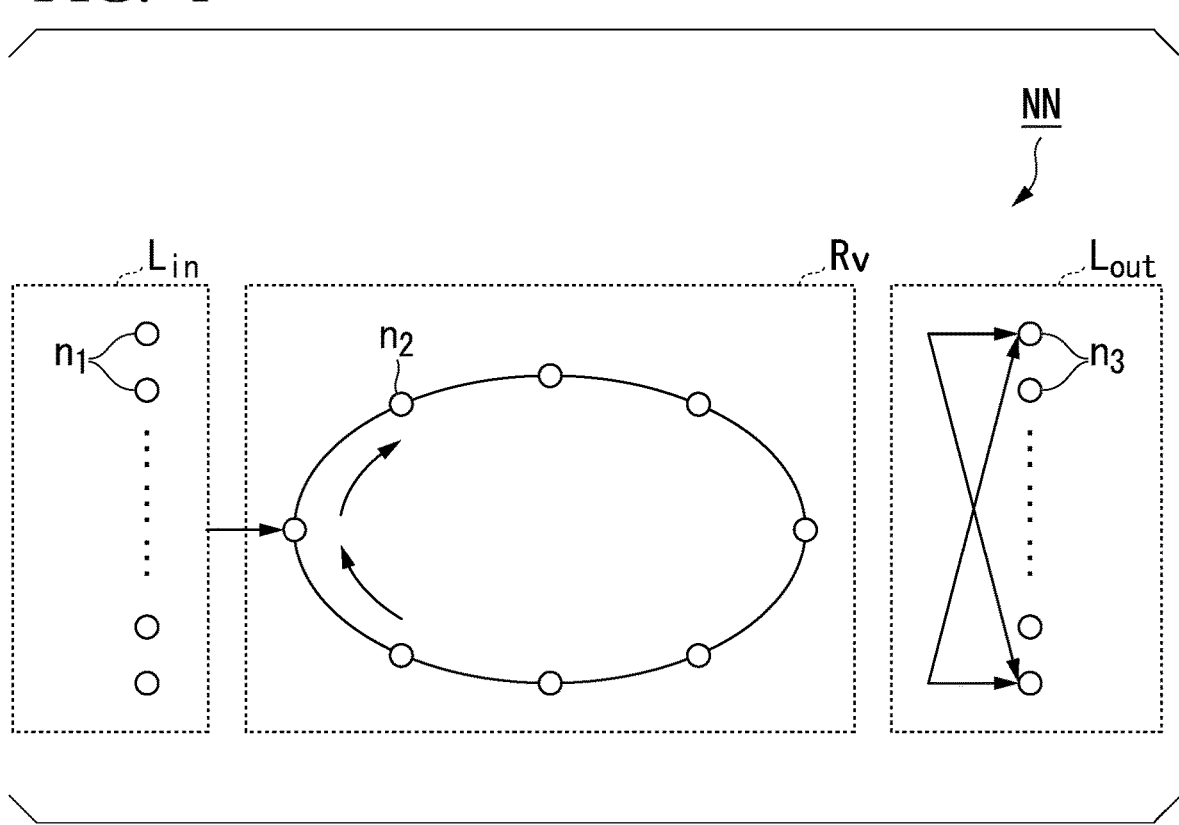
FIG. 1 is a conceptual diagram of reservoir computing.

Hereinafter, the present embodiment will be described in detail with reference to the drawings. In the drawings used in the following description, in order to make characteristics easy to understand, characteristic parts may be illustrated in an enlarged manner for the sake of convenience, and dimensional ratios or the like of each constituent element may differ from actual values thereof. Exemplary materials, dimensions, and the like illustrated in the following description are merely examples. The present invention is not limited thereto and can be suitably changed and performed within a range in which the effects of the present invention are exhibited.

FIG. 1 is a conceptual diagram of a neural network which is simulated by a reservoir element according to a first embodiment. A neural network NN illustrated in FIG. 1 is a conceptual schematic view of reservoir computing. The neural network NN illustrated in FIG. 1 has an input layer $L_{in}$, a reservoir Rv. and an output layer $L_{out}$. The input layer $L_{in}$ and the output layer $L_{out}$ are connected to the reservoir Rv.

The input layer $L_{in}$ transfers a signal input from the outside to the reservoir Rv. For example, the input layer $L_{in}$ includes a plurality of neurons $n_1$. An input signal input from the outside to each of the neurons $n_1$ of the input layer $L_{in}$ is transferred to the reservoir Rv.

The reservoir Rv stores an input signal input from the input layer $L_{in}$ and converts it into another signal. The reservoir Rv is connected to a plurality of neurons $n_2$. Learning is not performed between the neurons $n_2$ inside the reservoir Rv. The reservoir Rv projects an input signal to a multidimensional non-linear space. In the reservoir Rv, an input signal changes in a non-linear manner. That is, an input signal is substituted by another signal while holding original information. Due to interaction of an input signal inside the reservoir Rv, the state of the system of the reservoir Rv changes with elapse of time.

The output layer $L_{out}$ outputs a signal from the reservoir Rv. An output signal output from the output layer $L_{out}$ is substituted by another signal while having information of an input signal. Examples of the conversion include substitution from an orthogonal coordinate system (x, y, and z) to a spherical coordinate system (r, θ, and φ). For example, the output layer $L_{out}$ includes a plurality of neurons $n_3$. Learning is performed when a signal arrives at the output layer $L_{out}$ from the reservoir Rv. The output layer $L_{out}$ may be referred to as an identification layer. Learning is performed through transmission paths (synapses in the brain) respectively connecting the neurons $n_2$ of the reservoir Rv and the neurons $n_3$ of the output layer $L_{out}$ to each other. For example, the output layer $L_{out}$ identifies signals of the reservoir Rv in target classes through learning.

Reservoir computing imitates operations of the cerebellum. Reservoir computing prevents an increase in the calculation amount through learning with only coupling between the reservoir Rv and the output layer Lm.

<Circuit Constitution of Reservoir Element>

Figure 2:
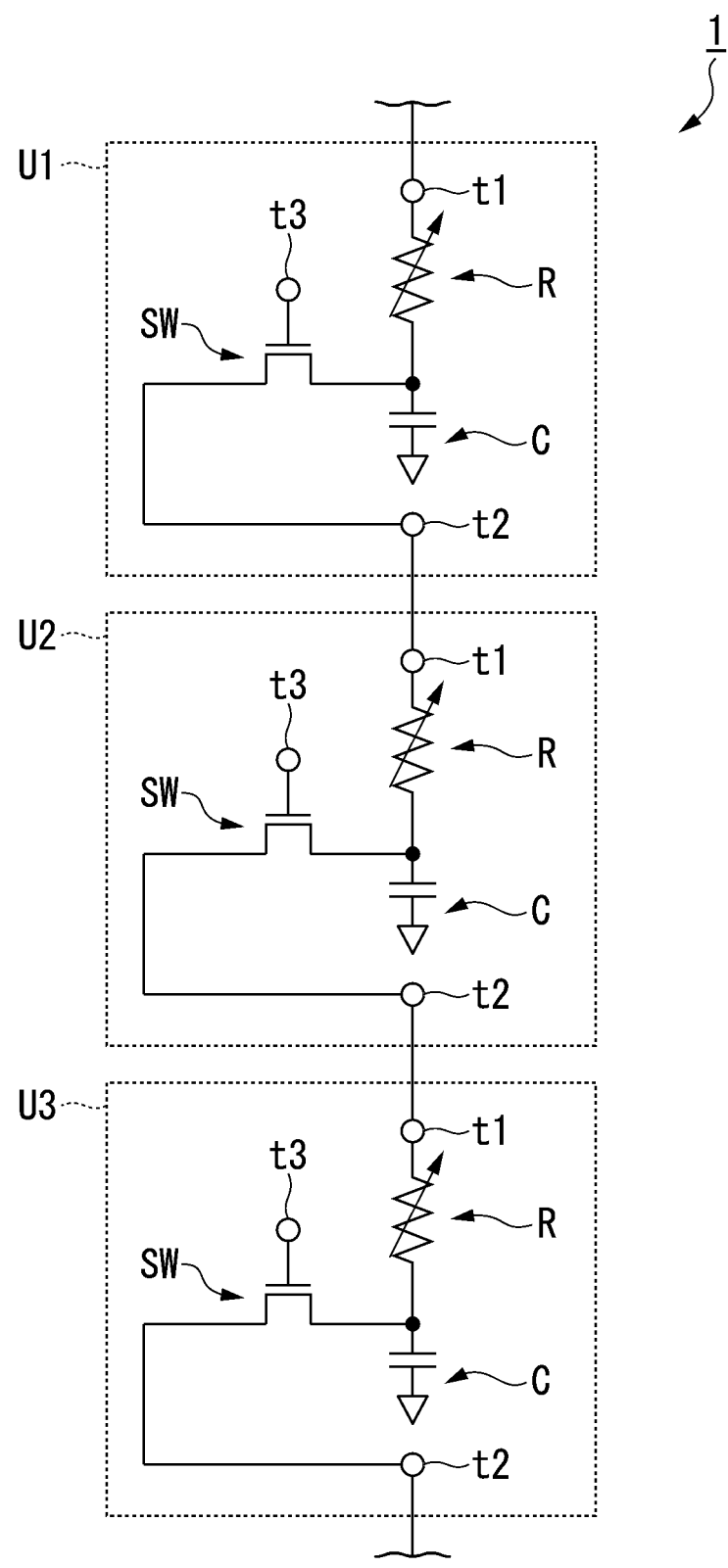
FIG. 2 is circuit diagram of a reservoir element according to a first embodiment.

FIG. 2 is circuit diagram of a reservoir element 1 according to the first embodiment. The reservoir element 1 is a physical element in which the concept of reservoir computing is realized. The reservoir element 1 has a plurality of units U1 to Un (n is a constant). Each unit (for example, the first unit U1) constituting the plurality of units U1 to Un is individually connected to a different unit (for example, the second unit U2). In the reservoir element 1 illustrated in FIG. 2, an output terminal t2 of the first unit U1 is connected to an input terminal t1 of the second unit U2.

At least one unit of the plurality of units U1 to Un differs from other units in an RC time constant. The RC time constant of each of the units U1 to Un differs, for example.

A variance of the RC time constant has a normal distribution, a Poisson distribution, or a binominal distribution, for example. When the RC time constant varies in each of the units U1 to Un, each of the units has different frequency characteristics so that an input signal is converted in a non-linear manner.

The RC time constant is determined on the basis of a resistance value of a resistor R and a capacitance of a capacitor C in each of the units U1 to Un. For example, at least one of the plurality of units U1 to Un may have a resistance value of the resistor R which differs from those of other units. The resistance value of the resistor R of each of the units U1 to Un varies, for example. In addition, for example, at least one of the plurality of units U1 to Un may have a capacitance of the capacitor C which differs from those of other units. The capacitance of the capacitor C of each of the units U1 to Un varies, for example. When at least one of the resistance value of the resistor R and the capacitance of the capacitor C varies, the RC time constant of each of the units U1 to Un varies.

Figure 3:
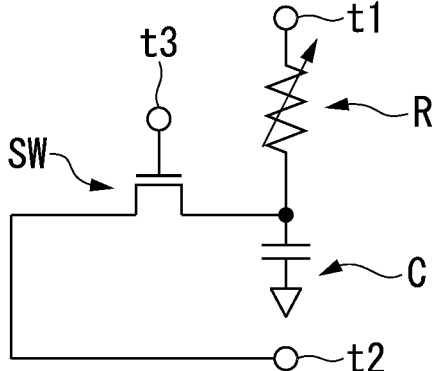
FIG. 3 is an enlarged view of one unit of the reservoir element according to the first embodiment.

FIG. 3 is an enlarged view of one unit of the reservoir element 1 according to the first embodiment. Each of the plurality of units U1 to Un includes the input terminal t1, the resistor R, the capacitor C, a switching element SW, the output terminal t2, and a control terminal t3.

The input terminal t1 is a terminal for inputting a signal to a unit. A signal input to the input terminal t1 will be referred to as a first signal, for example. The input terminal t1 is connected to a first end of the resistor R.

The resistor R is connected to the input terminal t1 and the capacitor C. The first end of the resistor R is connected to the input terminal t1, and a second end thereof is connected to the capacitor C. For example, the resistor R is a two-terminal-type variable resistor having a variable resistance value. Three or more resistance states are preferably able to be selected for the resistor R, and analog resistance change is preferably able to be performed. For example, the resistor R is a phase change element (PCM), a resistance change-type memory (ReRAM), a magnetic resistance change element (MRAM), a ferroelectric memory (FeRAM), or a carbon nanotube (CNT) element.

If the resistor R is a variable resistor, the resistance value of the resistor R can be adjusted. For example, if the variance of the resistance value of the resistor R is optimized between the units U1 to Un, the number of units necessary to convert an input signal in a non-linear manner decreases. A decrease in the number of necessary units leads to the ability to miniaturize the reservoir element 1. In addition, in reservoir computing, generally, although there is a problem with industrialization in that outputs are significantly affected by fluctuation in coupling of a reservoir main body portion or a constitution, such fluctuation can be suppressed and adjusted using a resistance change element.

The capacitor C is connected to the resistor R and a reference potential. One electrode plate of the capacitor C is connected to the second end of the resistor R, and the other electrode plate is connected to the reference potential. For example, the reference potential is the ground. Electric charges corresponding to the resistance value of the resistor R and the pulse width and the peak value of the first signal are accumulated between the electrode plates of the capacitor C.

The switching element SW is a switching element for controlling a flow of a current. If the switching element is in an on-state, the switching element is in a conducting state and is electrically connected. If the switching element is in an off-state, the switching element is in a cut-off state and is electrically cut off. For example, the switching element is a field-effect transistor, a bipolar transistor, an ovonic threshold switch, or the like. Hereinafter, description will be given on the basis of an example in which the switching element is a field-effect transistor.

A source of the switching element SW is connected to the capacitor C. A drain of the switching element SW is connected to the output terminal t2. A gate of the switching element SW is connected to the control terminal t3. The control terminal t3 is a terminal for controlling on/off of the switching element SW. For example, the control terminal t3 is connected to a control unit.

<Element Constitution of Reservoir Element>

Figure 4:
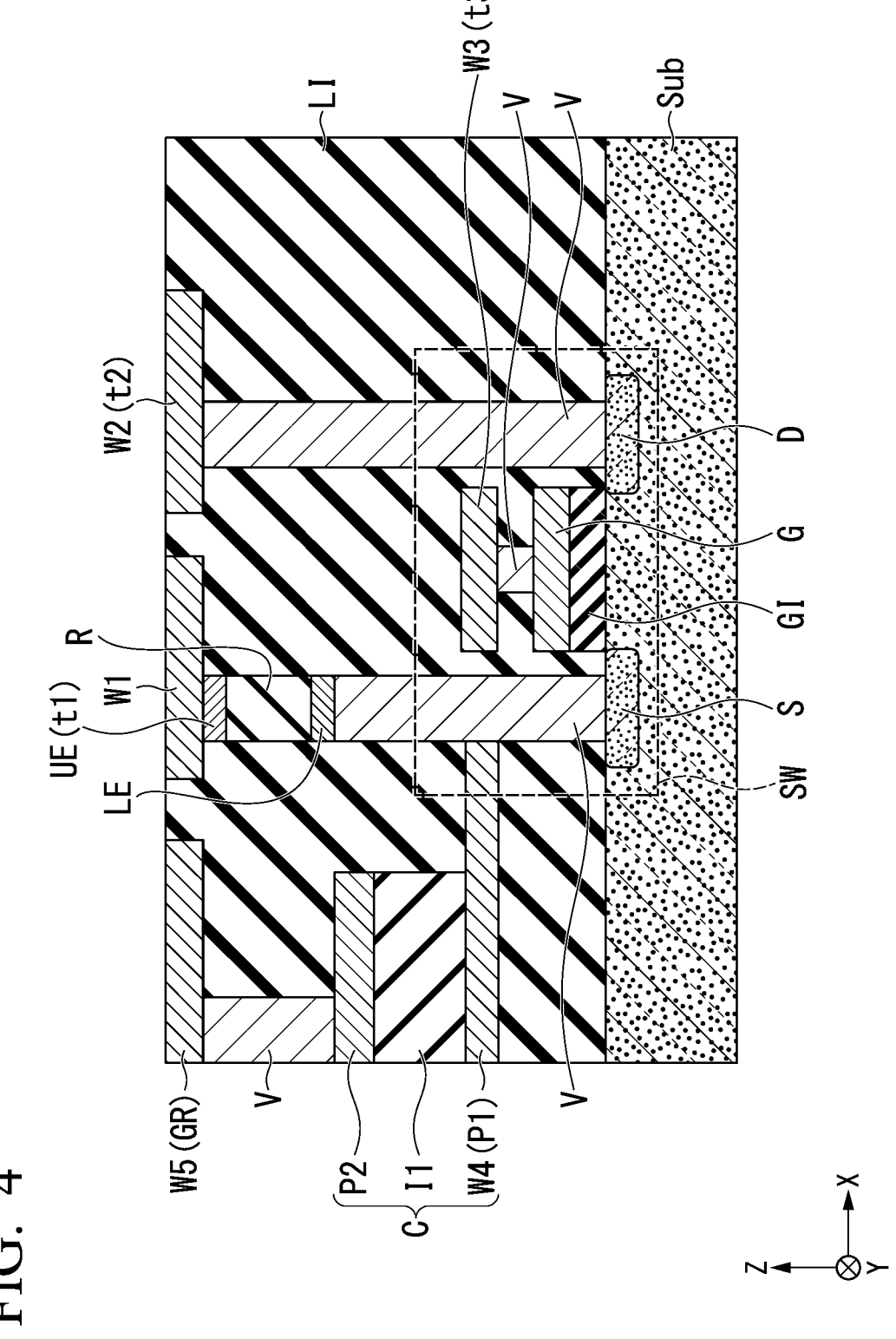
FIG. 4 is a cross-sectional view illustrating an element structure of one unit of the reservoir element according to the first embodiment.

FIG. 4 is a cross-sectional view illustrating an element structure of one unit of the reservoir element 1 according to the first embodiment. In FIG. 4, one direction on a surface of a substrate Sub will be referred to as an X direction, a direction orthogonal to the X direction will be referred to as a Y direction, and a direction away from the substrate Sub will be referred to as a Z direction.

The reservoir element 1 is divided into a plurality of layers in the Z direction. The resistor R, the capacitor C, and the switching element SW are provided in the respective layers. The elements in the respective layers are connected by a via wiring V and wirings W1 to W5. The via wiring V is a wiring extending in the Z direction. The wirings W1 to W5 are wirings extending in some directions within an XY plane. The elements in the respective layers are insulated by an interlayer insulation film LI.

For example, the interlayer insulation film LI is formed of silicon oxide $(SiO_x)$, silicon nitride $(SiN_x)$, silicon carbide (SiC), chromium nitride, silicon carbonitride (SiCN), silicon oxynitride (SiON), aluminum oxide $(Al_2O_3)$, zirconium oxide $(ZrO_x)$, or the like.

For example, the switching element SW is provided on the substrate Sub. For example, the switching element SW is a field-effect transistor and has a gate G, a gate insulation film GI, and a source S and a drain D formed on the substrate Sub. For example, the substrate Sub is a semiconductor substrate.

The source S of the switching element SW is electrically connected to the resistor R by the via wiring V. For example, the resistor R is interposed between an upper electrode UE and a lower electrode LE. The upper electrode UE corresponds to the input terminal t1 in the circuit diagram. The input terminal t1 is connected to the wiring W1.

The drain D of the switching element SW is electrically connected to the wiring W2 by the via wiring V. The wiring W2 is connected to the output terminal t2 in the circuit diagram.

The gate G of the switching element SW is electrically connected to the wiring W3 by the via wiring V. The wiring W3 is connected to the control terminal t3 in the circuit diagram.

The via wiring V connecting the source S of the switching element SW and the resistor R to each other is connected to the wiring W4 at any position of the via wiring V extending in the Z direction. The wiring W4 also serves as an electrode plate P1 of the capacitor C. The capacitor C is constituted of two electrode plates P1 and P2 and an insulation layer I1 interposed therebetween. The electrode plate P2 of the capacitor C is electrically connected to the wiring W5 by the via wiring V. For example, the wiring W5 is earthed to a ground GR.

7

<Operation of Reservoir Element>

Next, the operation of the reservoir element according to the first embodiment will be described. First, the output operation of outputting a signal from one unit will be described.

First, the switching element SW is turned off by the control terminal t3. In this state, an input signal is input from the input terminal t1. The input signal arrives at the capacitor C via the resistor R, and the capacitor C is charged. The amount of electric charges accumulated in the capacitor C is determined based on the resistance value of the resistor R, the pulse width and the peak value of an input signal, and the capacitance of the capacitor C.

After electric charges are sufficiently accumulated in the capacitor C, the switching element SW is turned on. If the switching element SW is turned on, electric charges accumulated in the capacitor C are discharged. A signal corresponding to a discharging current is output from the capacitor C. The signal arrives at the output terminal t2. A signal output from the capacitor is a spike signal Each of the units U1 to Un also functions as a node of a spiking neural network.

A signal output from the capacitor changes in accordance with the resistance value of the resistor R the pulse width and the peak value of an input signal, and the capacitance of the capacitor C. In other words, a signal output from the output terminal t2 differs in accordance with the resistance value of the resistor R, the pulse width and the peak value of an input signal, and the capacitance of the capacitor C.

Next, propagation of a signal between different units will be described. In the reservoir element 1 illustrated in FIG. 2, the output terminal t2 and the input terminal t1, which are adjacent units, are connected to each other. The output terminal t2 of the first unit U1 is connected to the input terminal t1 of the second unit U2. An output signal of the first unit U1 is input to the input terminal t1 of the second unit U2. An output signal of the first unit U1 is a converted signal of an input signal of the first unit U1. A signal having information of an input signal of the first unit U1 is input to the second unit U2.

A signal input to the first unit U1 is propagated between the units. Here, the RC time constant of each of the units U1 to Un varies. If the RC time constant differs, the amount of electric charges accumulated in the capacitor C differs. A signal input to the first unit U1 is converted in a non-linear manner while being propagated between the units. A signal has non-linearity due to the variance of the RC time constant. Meanwhile, a propagated signal has information of a signal input to a preceding unit and stores the results of signal conversion in the preceding unit. That is, the reservoir element 1 has non-linearity and a memory effect and functions as reservoir computing.

As described above, since the RC time constant of each of the units vanes, the reservoir element 1 functions as reservoir computing.

In addition, if the resistor R is a variable resistor, the degree of variance of the RC time constant is easily adjusted. If the variance of the RC time constant of each of the units is optimized, the number of units necessary to convert an input signal in a non-linear manner decreases. A decrease in the number of necessary units leads to miniaturization of the reservoir element 1. In addition, the variance of outputs of the reservoir element can be suppressed and adjusted using the resistance change element.

In addition, if the resistor R is a two-terminal-type, it is easily manufactured, and a manufacturing process can be simplified. In addition, if the resistor R is a two-terminal-type, the number of layers may be small, and it can be produced at low cost.

Hereinabove, the embodiment of the present invention has been described in detail with reference to the drawings. However, each of the constitutions, combinations thereof, and the like in each embodiment are merely examples, and additions, omissions, replacements, and other changes to the constitutions can be made within a range not departing from the gist of the present invention.

First Modification Example

Figure 5:
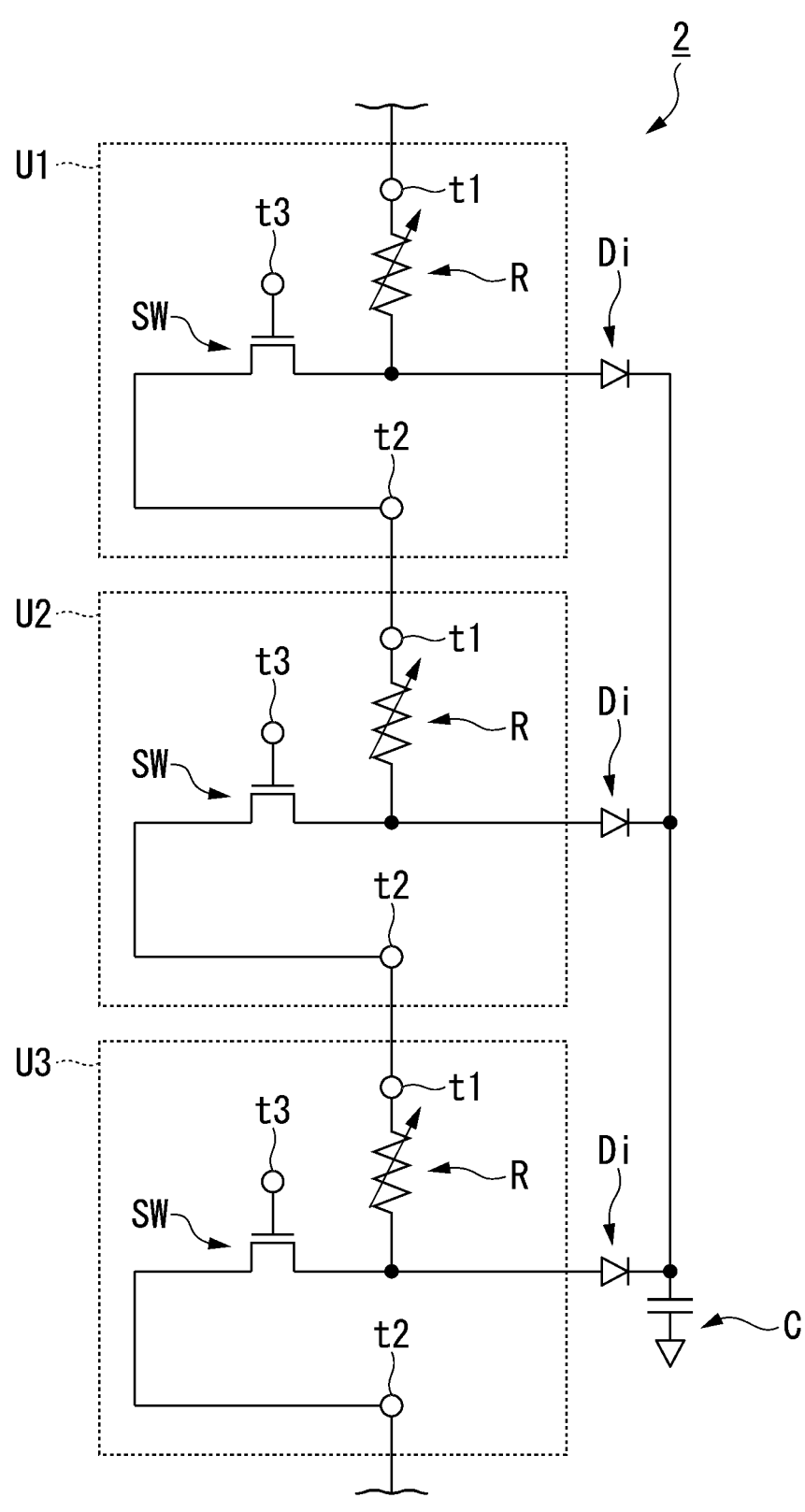
FIG. 5 is circuit diagram of a characteristic part of a reservoir element according to a first modification example.

FIG. 5 is an enlarged circuit diagram of a characteristic part of a reservoir element 2 according to a first modification example. The reservoir element 2 according to the first modification example differs from the reservoir element 1 illustrated in FIG. 2 in that the capacitor C is shared by three units U1, U2, and U3. The constitution is otherwise similar to that of the reservoir element 1 of the first embodiment except for those described below.

The reservoir element 2 according to the first modification example is shared by two or more units. The capacitor C is provided between the resistor R and the switching element SW in each of the first unit U1, the second unit U2, and the third unit U3. It is preferable that a diode Di for preventing a reverse flow of electric charges be provided between the resistor R and the switching element SW. A timing when electric charges are accumulated in the capacitor C can be adjusted depending on an operation timing of the control terminal 3 of the first unit U1, the second unit U2, and the third unit U3.

The reservoir element 2 according to the first modification example has effects similar to those of the reservoir element according to the first embodiment and functions as reservoir computing.

Second Modification Example

Figure 6:
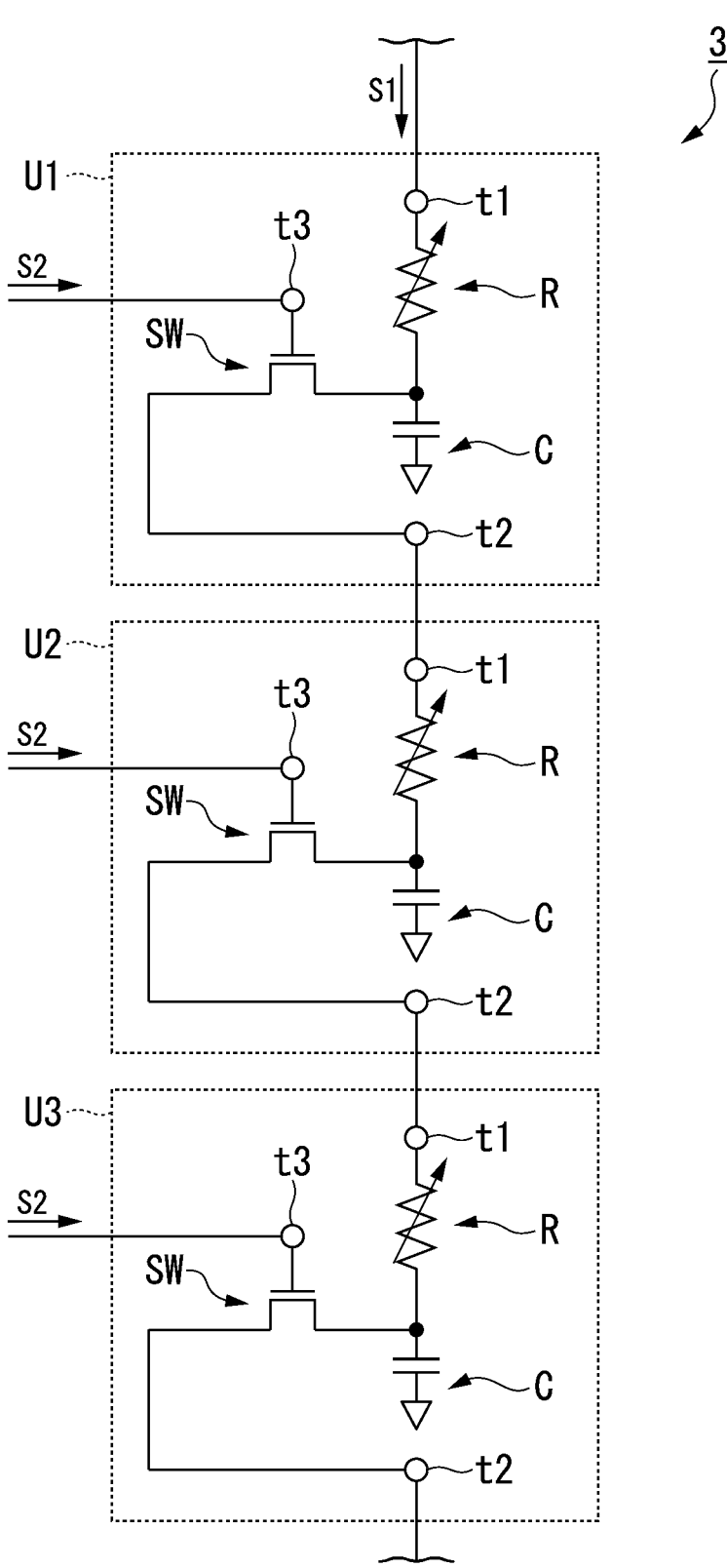
FIG. 6 is circuit diagram of a characteristic part of a reservoir element according to a second modification example.

FIG. 6 is an enlarged circuit diagram of a characteristic part of a reservoir element 3 according to a second modification example. The reservoir element 3 according to the second modification example differs from the reservoir element 1 illustrated in FIG. 2 in that another signal is input from the control terminal t3. The constitution is otherwise similar to that of the reservoir element 1 of the first embodiment except for those described below.

A first signal S1 is input to the input terminal t1 of each of the units U1 to Un of the reservoir element 3. In addition, a second signal S2 is input to the control terminal t3 of each of the units U1 to Un of the reservoir element 3. For example, the second signal S2 is an input signal different from the first signal S1.

For example, the second signal S2 controls a time of opening and closing of the switching element SW. An output signal from the output terminal t2 changes depending on the time of opening and closing of the switching element SW. Even when the time of opening and closing of the switching element SW is constant as described above, an output signal differs in accordance with the resistance value of the resistor R, the pulse width and the peak value of an input signal, and the capacitance of the capacitor C. If the time of opening and closing of the switching element SW changes, the number of parameters for changing an output signal increases.

The reservoir element 3 according to the second modification example has effects similar to those of the reservoir element according to the first embodiment and functions as reservoir computing. In addition, since the number of parameters for changing an output signal increases, non-linearity of a converted signal is enhanced.

Third Modification Example

Figure 7:
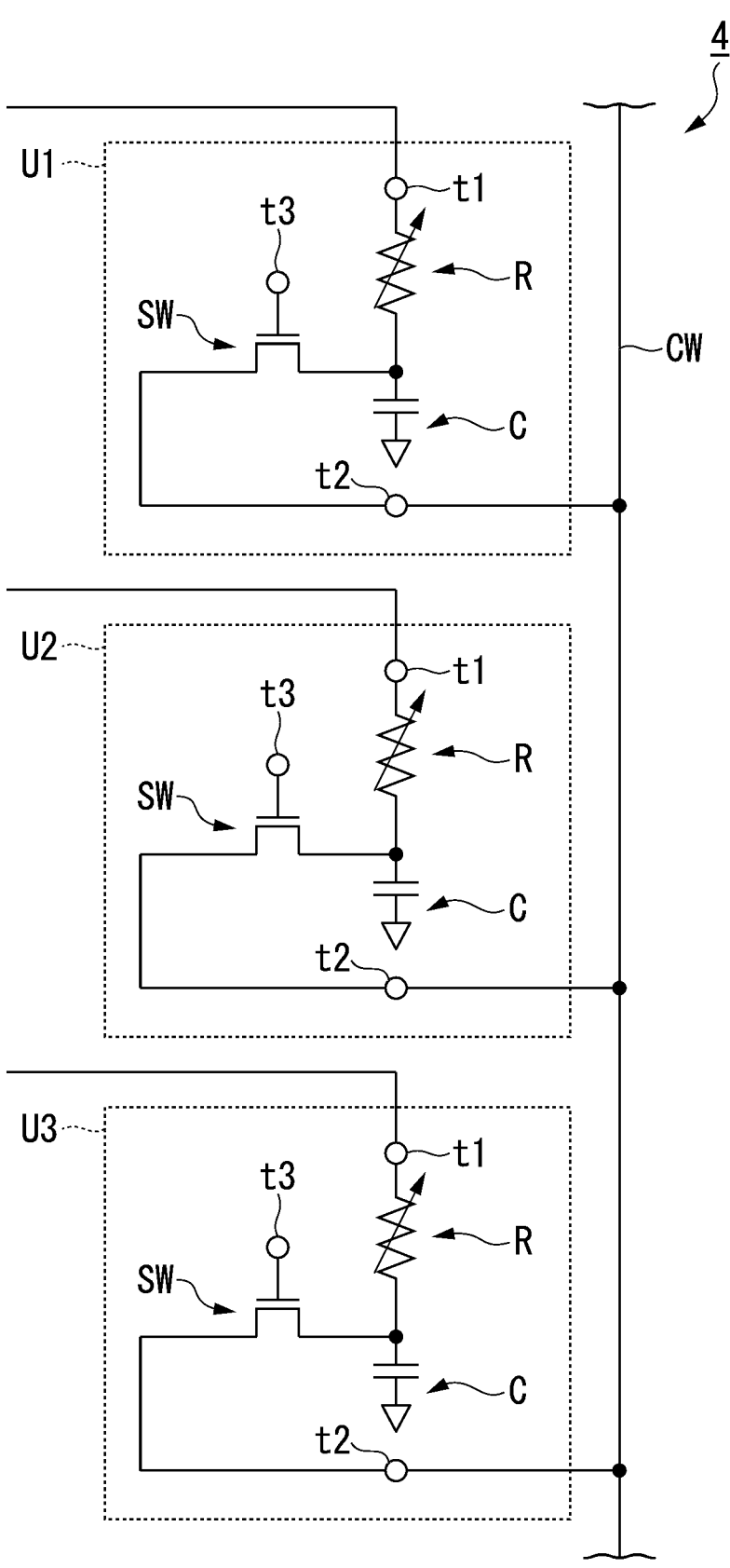
FIG. 7 is circuit diagram of a characteristic part of a reservoir element according to a third modification example.

FIG. 7 is an enlarged circuit diagram of a characteristic part a reservoir element 4 according to a third modification example. The reservoir element 4 according to the third modification example differs from the reservoir element 1 illustrated in FIG. 2 in connection of each of the units U1 to Un. The constitution is otherwise similar to that of the reservoir element 1 of the first embodiment except for those described below.

In the reservoir element 4, the output terminals t2 of the first unit U1, the second unit U2, and the third unit U3 of the plurality of units U1 to Un are connected to the same shared wiring CW. The input terminal t1 of each of the units U1 to Un is individually connected to a different input circuit.

Signals input to the respective units U1 to Un are individually converted and merged at the shared wiring CW. Merged signals will interact with each other. A signal input to the shared wiring CW from each of the signals varies. The signals converted in a non-linear manner merged at the shared wiring CW, thereby interacting with each other.

Therefore, the reservoir element 4 according to the third modification example has effects similar to those of the reservoir element 1 according to the first embodiment and functions as reservoir computing.

Fourth Modification Example

Figure 8:
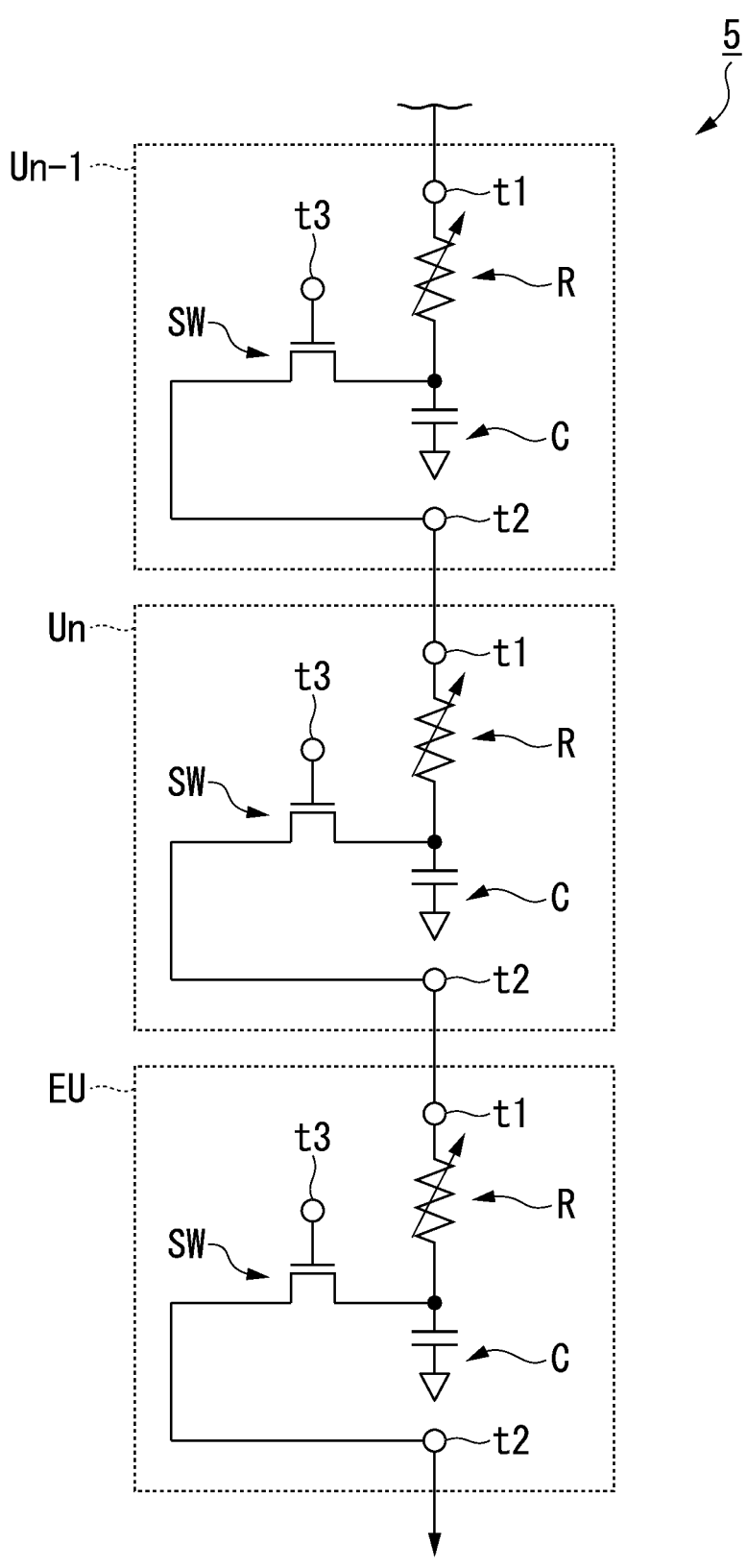
FIG. 8 is circuit diagram of a characteristic part of a reservoir element according to a fourth modification example.

FIG. 8 is an enlarged circuit diagram of a characteristic part of a reservoir element 5 according to a fourth modification example. The reservoir element 5 according to the fourth modification example differs from the reservoir element 1 illustrated in FIG. 2 in further having an external connection unit EU. The constitution is otherwise similar to that of the reservoir element 1 of the first embodiment except for those described below.

The external connection unit EU is connected to at least one of the units U1 to Un described above and the outside. For example, the external connection unit EU is connected to a terminal end of each of the units U1 to Un which are connected to each other.

The external connection unit EU includes the input terminal t1, the resistor R the capacitor C, the switching element SW, the output terminal t2, and the control terminal 3. The output terminal t2 of the external connection unit EU is connected to the outside. The element constitution of the external connection unit EU is the same as the element constitution of each of the units U1 to Un. For this reason, the external connection unit EU can be produced through the same process as the units U1 to Un.

For example, the resistor R of the external connection unit EU is a resistance change element. The external connection unit EU can perform learning by changing the resistance value of the resistor R in accordance with the weight of data. The external connection unit EU corresponds to the output layer and the identification layer described above.

The reservoir element 5 according to the fourth modification example has effects similar to those of the reservoir element 1 according to the first embodiment and functions as reservoir computing. In addition, regarding a physical device for a reservoir element, there are many studies mainly focusing on fabricating a reservoir main body portion as a device, but fabricating it as a device including an identification layer in a latter stage has not yet received sufficient attention. The reservoir element 5 has the external connection unit EU and is fabricated as a device including an identification layer.

The external connection unit EU according to the fourth modification example may be connected to the units U1 to Un according to the first modification example to the third modification example.

REFERENCE SIGNS LIST 1, 2, 3, 4 Reservoir element
C Capacitor
R Resistor
Rv Reservoir
S1 First signal
S2 Second signal
SW Switching element
t1 Input terminal
t2 Output terminal
t3 Control terminal
U1 to Un Plurality of units
U1 First unit
U2 Second unit
EU External connection unit
The invention claimed is:

1. A reservoir element comprising:
a plurality of units,
wherein each of units constituting the plurality of units is connected to at least one or more different units,
wherein each of the plurality of units includes
an input terminal to which a first signal is input,
a resistor of which one end is connected to the input terminal,
a capacitor connected between the other end of the resistor and a reference potential,
a switching element which is a field effect transistor having a source, a drain, and a gate, the source being connected to the other end of the resistor and the capacitor, and
an output terminal which is connected to the drain of the switching element, and
wherein at least one unit of the plurality of units differs from other units in an RC time constant.

2. The reservoir element according to claim 1,
wherein a resistance value of the resistor of at least one of the plurality of units is different from a resistance value of the resistor of the other units.

3. The reservoir element according to claim 1,
wherein a capacity of the capacitor of at least one of the plurality of units is different from a capacity of the capacitor of the other units.

4. The reservoir element according to claim 1,
wherein the resistor is a two-terminal-type variable resistor having a variable resistance value.

5. The reservoir element according to claim 4,
wherein three or more resistance states are able to be selected for the resistor.

6. The reservoir element according to claim 1,
wherein an output terminal of a first unit of the plurality of units is connected to an input terminal of a second unit different from the first unit.

7. The reservoir element according to claim 1,
wherein an output terminal of a first unit of the plurality of units and an output terminal of a second unit different from the first unit are connected to the same wiring.

8. The reservoir element according to claim 1,
wherein a second signal is input to the gate of the
switching element.

9. The reservoir element according to claim 1,
wherein the capacitor is shared by two or more units.

10. P The reservoir element according to claim 1,
wherein the resistor is any of a phase change element, a
resistance change-type memory, a magnetic resistance
change element, a ferroelectric memory, and a carbon
nanotube element.

11. The reservoir element according to claim 1, further
comprising:
an external connection unit which is connected to at least
one of the plurality of units and the outside,
wherein the external connection unit includes
an input terminal to which a first signal is input,
a resistor of which one end is connected to the input
terminal,
a capacitor which is connected between the other end of
the resistor and a reference potential,
a switching element which is a field effect transistor
having a source, a drain, and a gate, the source being
connected to the other end of the resistor and the
capacitor, and an output terminal which is connected to the drain of
the switching element.

12. The reservoir element according to claim 11,
wherein a resistor in the external connection unit is a
resistance change element.

13. The reservoir element according to claim 1,
wherein the time constants of the reservoir elements
follow a normal distribution, a Poisson distribution, or
a binominal distribution.

14. An arithmetic circuit that is one of a plurality of units
in which at least one unit has a different RC time constant,
the arithmetic circuit comprising:
an input terminal to which a first signal is input;
a resistor of which one end is connected to the input
terminal;
a capacitor which is connected to an opposite side of the
resistor to the input terminal and is provided between
the resistor and a reference potential;
a switching element which is a field effect transistor
having a source, a drain, and a gate, the source being
connected to the other end of the resistor and the
capacitor; and
an output terminal which is connected to the drain of the
switching element.

* * * * *